US007685412B1

(12) United States Patent
Burdick et al.

(10) Patent No.: US 7,685,412 B1
(45) Date of Patent: Mar. 23, 2010

(54) CONFIGURATION SETTINGS

(75) Inventors: Matthew J. Burdick, Sunnyvale, CA (US); Gregoire Jaunin, Lausanne (CH)

(73) Assignee: Microsoft Corporation, Redmond, WA (US)

( * ) Notice: Subject to any disclaimer, the term of this patent is extended or adjusted under 35 U.S.C. 154(b) by 1555 days.

(21) Appl. No.: 10/699,629

(22) Filed: Oct. 30, 2003

(51) Int. Cl.
*G06F 9/24* (2006.01)
*G06F 15/177* (2006.01)

(52) U.S. Cl. .............. 713/1; 713/2; 713/100; 717/174; 717/175; 717/176

(58) Field of Classification Search .............. 713/1, 713/2, 100; 717/174, 175, 176
See application file for complete search history.

(56) References Cited

U.S. PATENT DOCUMENTS

| | | | | |
|---|---|---|---|---|
| 6,161,176 A | * | 12/2000 | Hunter et al. | 713/1 |
| 6,871,221 B1 | * | 3/2005 | Styles | 709/221 |
| 2002/0026436 A1 | * | 2/2002 | Joory | 707/1 |
| 2003/0204711 A1 | * | 10/2003 | Guess | 713/1 |
| 2004/0098472 A1 | * | 5/2004 | Styles et al. | 709/221 |
| 2004/0172622 A1 | * | 9/2004 | Francis | 717/121 |
| 2004/0243997 A1 | * | 12/2004 | Mullen et al. | 717/174 |
| 2005/0005005 A1 | * | 1/2005 | Styles et al. | 709/223 |

* cited by examiner

*Primary Examiner*—Thomas Lee
*Assistant Examiner*—Michael J Brown

(57) ABSTRACT

Configuration settings are described which may be utilized to indicate a configuration of an application. In an exemplary implementation, a method includes validating a configuration setting of a first application for use with a second application. The configuration setting includes a first field and a first description of a first condition for the first field. The second application is composed of computer instructions that include an attribute. The attribute provides a second description of a second condition for a second field. If the first field corresponds to the second field, then the first description of the first condition is compared with the second description of the second condition to determine whether the first condition is met by the second condition. If the first condition is met, the configuration setting is determined to be valid for use with the second application.

43 Claims, 10 Drawing Sheets

400

402 Examine the Application to Find a Configuration Setting of the Application that corresponds to a Configuration Setting from the Configuration File 404 Comparing the fields and the respective descriptions and Determining validity from the respective descriptions

CONFIGURATION SETTINGS

TECHNICAL FIELD

The present invention generally relates to the field of applications and more particularly relates to configuration settings for applications.

BACKGROUND

Users have access to an increasing variety of content providers that provide an ever increasing array of content. Television services, for instance, are widely used for delivering content. Subscribers of television services are offered a broad assortment of content, including traditional broadcast programs and movies. Newer, interactive television (ITV) systems expand the assortment of content that may be provided from a content provider. ITV systems offer the same traditional services of familiar cable television as well as a variety of new additional interactive services, such as the use of applications. Examples of applications include video-on-demand (VOD) which permits a user to order videos and watch the videos whenever desired, home shopping applications which enable a user to browse various stores and catalogs on TV and order products from home, and financial applications which allow a user to conduct banking and other financial transactions using the television. Additionally, users may also access service applications and functionality from the content provider, such as games, Internet browsers, email applications, and so on.

The applications, when written by a developer, may have a plurality of configuration settings that specify fields and conditions for the fields that are utilized by the applications to provide desired content. A configuration document may be written to describe the configuration settings of the application so that developers writing other applications that interact with the application may be made aware of the relevant configuration settings. For example, a developer writing a browser application may utilize the configuration document to specify settings of the browser so that it is compatible with an application that provides web pages. Therefore, when a user executes the browser application utilizing a client, such as a set-top box, the browser is able to retrieve web pages from the applications that provide web pages.

The configuration document, however, may not reflect the current state of the application when it is being written and/or even after the application has been completed. For example, changes may be made to the configuration settings when writing the application that are not reflected in the configuration document. Therefore, other developers that are writing portions of the application may not be aware of the changes that were made, which may affect the interoperability of the application. For example, a first developer may write a portion of the application that specifies a configuration setting of a request format that may be received by the application. When writing the portion of the application, the first developer may change the request format. If a second developer is not aware of the format change, a portion of the application that is written by the second developer that processes the requests may not be compatible with the changed format. Additionally, a developer that wrote the configuration document may not be the same developer that wrote the application. Therefore, information and nuances that are known by the developer that wrote the application may be omitted from the configuration document. Further, human error may be encountered when writing the configuration document. The application, for instance, may contain thousands of lines of computer instructions that include configuration settings for the application. A developer may therefore miss configuration settings when writing the configuration document that are included in the lines of computer instructions, which may affect the interoperability with other applications.

Therefore, there is a continuing need to provide improved configuration settings that are locatable and from which a configuration document can be generated that accurately describes the current state thereof.

SUMMARY

Configuration settings are described which may be utilized to indicate a configuration of an application. For example, a remotely based application may be executed on a content server to provide content, such as a movie, web page, and so on, to a client-based application that is executed on a set-top box to view the content. To enable the remotely based application to work with the client-based application, it is desirable that the remotely based application have configuration settings that are valid for use with the client-based application, and vice versa. A configuration module is described which allows configuration settings of the applications to be validated, one to another, such that validity of the applications may be determined. In an exemplary implementation, a method includes validating a configuration setting of a first application for use with a second application. The configuration setting includes a first field and a first description of a first condition for the first field. The second application is composed of computer instructions that include an attribute. The attribute provides a second description of a second condition for a second field. If the first field corresponds to the second field, then the first description of the first condition is compared with the second description of the second condition to determine whether the first condition is met by the second condition. If the first condition is met, the configuration setting is determined to be valid for use with the second application.

Also described is a documenter that generates a configuration file that contains the configuration settings of the application. The documenter may write a field and descriptions thereof to document the configuration settings of the application. Each such field, for instance, may have a plurality of descriptions of conditions for the field. Each such description and the corresponding field may provide a configuration setting, such as a value constraint, default value, textual description, and so on. For instance, the field "letter grade" may have a value constraint that specifies that the letters "A", "B", "C", "D", and "F" for a value of the field. Therefore, the field "letter grade" and the value constraint describe a configuration setting of the application. In an exemplary implementation, a method includes executing a documenter to find a plurality of fields in an application. The application is composed of computer instructions that have attributes. Each attribute provides a description of a condition for a respective field. A configuration file is formed having a plurality of configuration settings of the application. Each configuration setting includes one of the fields and the description of the condition for the respective one of the fields. The configuration file is then output.

In an additional implementation, the configuration file generated by the documenter may be utilized through execution of the configuration module to validate configuration settings. For example, a method may include generating a configuration file having a plurality of configuration settings derived from a first application. The application is composed of computer instructions having attributes. Each attribute provides a description of a condition for a field. Each configuration setting includes one of the fields and a corresponding description. The first application is validated for use with a second application by comparing each configuration setting of the first application with a corresponding configuration setting of the second application to determine whether each condition of the first application is met by a corresponding condition of the second application.

BRIEF DESCRIPTION OF THE DRAWINGS

The same reference numbers are utilized in instances in the discussion to reference like structures and components.

DETAILED DESCRIPTION

Overview

Figure 1:
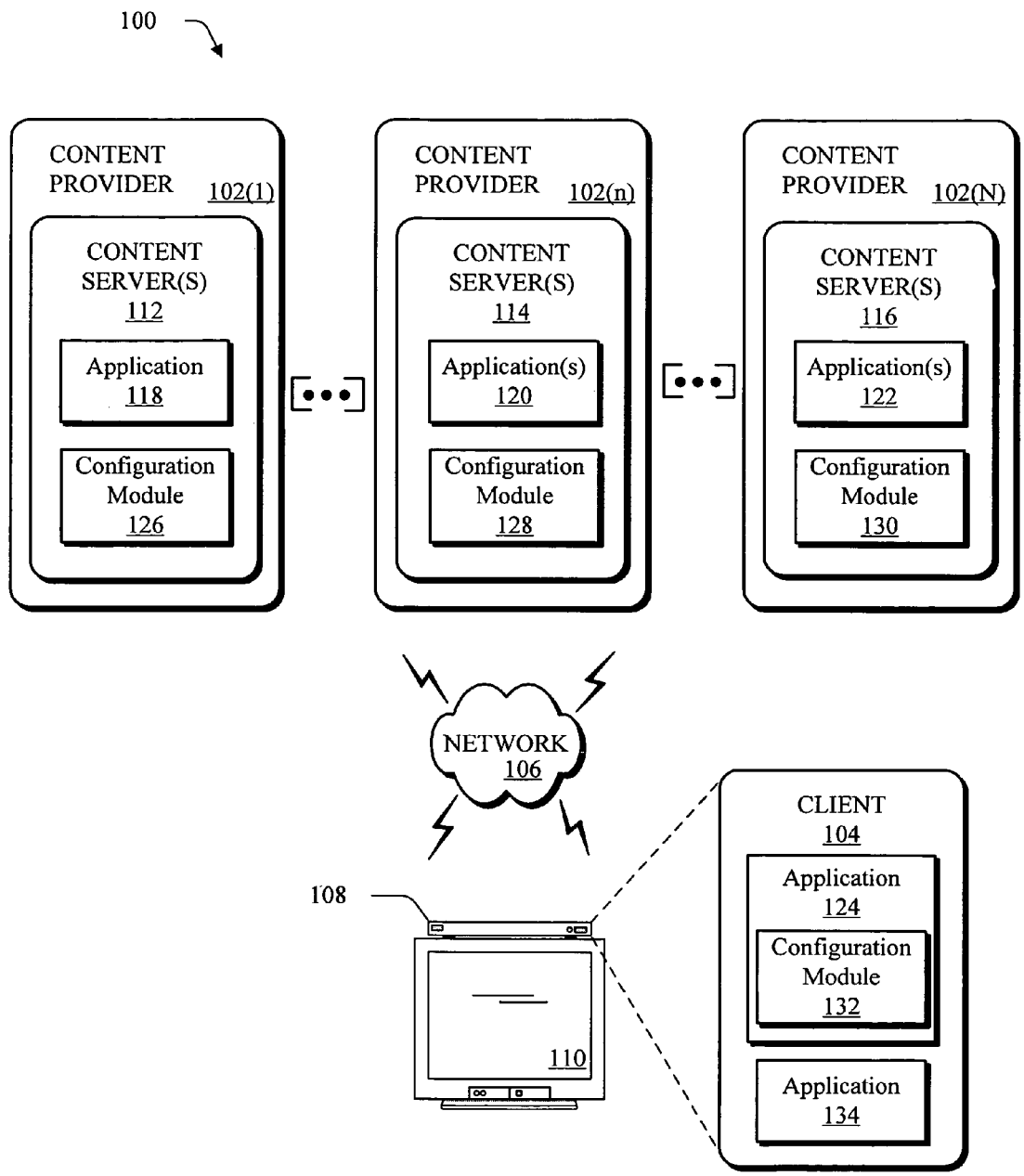
FIG. 1 is an illustration of an exemplary implementation showing an environment that includes a plurality of content providers communicatively coupled to a client over a network.

Configuration settings are described. To enable remotely based applications to work with client-based applications, it is desirable that the remotely based applications understand the configuration of the client-based application, and vice versa. For example, a remotely based application may be executed on a content server to provide content, such as a movie, web page, and so on, to a client-based application that is executed on a set-top box. Configuration settings are utilized to indicate conditions for execution of the application. For example, configuration settings may indicate data that may be processed by an application and a format for receiving the data for processing. Additionally, configuration settings may also indicate how data is output by the application and a format of the output data. A configuration module is described which allows configuration settings of a different application to be validated against current configuration settings of the application in question, and vice versa. For example, a developer may write a service application that provides web pages. The configuration module may be utilized to validate configuration settings of the service application for use with other applications that will interact with the service application, such as browsers. Thus, configuration settings of the service application may be validated for use with configuration settings of the browser before the service application is launched. Likewise, configuration settings of the browser may also be validated for use with the service application by execution of the configuration module. Additional discussion of the configuration module may be found in relation to FIGS. 1-4, 6 and 8.

A documenter is also described which may write configuration settings of the application to generate a configuration file. The configuration settings may include a name of a field, a type of the field, and a description of a condition for the field. The condition may include value constraints, such as valid string patterns, scalar ranges for integer settings, and so on. A field may have corresponding metadata information called an attribute. The attribute describes the condition for the field, such as value constraints and default values of the field. The condition may relate special field behavior and/or properties of the field. For instance, a field "user name" may have a value "john doe". An attribute that corresponds to the field "user name" may have a description which relates that a condition for the field, such as that the field "user name" is to have values which have a first and a last name. Thus, the field "user name" has a value "john doe", and the corresponding attribute has a description of the condition "first and last name". The documenter may write the field and the descriptions obtained from the attributes to a configuration file to document the configuration settings of the application. Thus, the configuration file may describe the field and include data that is obtained from the application that describes the field. Additional discussion of the documenter may be found in relation to FIGS. 2, 5 and 7.

Exemplary Environment

FIG. 1 is an illustration of an exemplary implementation showing an environment 100 that includes a plurality of content providers 102(1), . . . , 102(n), . . . , 102(N) communicatively coupled to a client 104 over a network 106. The client 104 may be configured as a computer that is capable of communication over the network 106, such as a mobile station, an entertainment appliance, a set-top box 108 and television 110 as illustrated, and so forth. The client 104 may also relate to a person and/or entity that operates the client. In other words, client 104 may describe a logical client that includes a user and/or a machine. Network 106 may be formed from one or more networks, such as the Internet, an intranet, a wired or wireless telephone network, a broadcast network, and so forth.

Each of the content providers 102(1)-102(N) includes one or more content servers 112, 114, 116. Each of the content servers 112-116 may execute a respective one of the applications 118, 120, 122 to provide content to the client 104. For example, each of the applications 118-122 may be configured as a service application to provide web content such as web pages and e-commerce functionality to the client 104. The client 104 may interact remotely with the applications 118-122 over the network 106 by executing an application 124 configured as a browser. An additional description of an environment that includes the client and content providers 102

Figure 10:
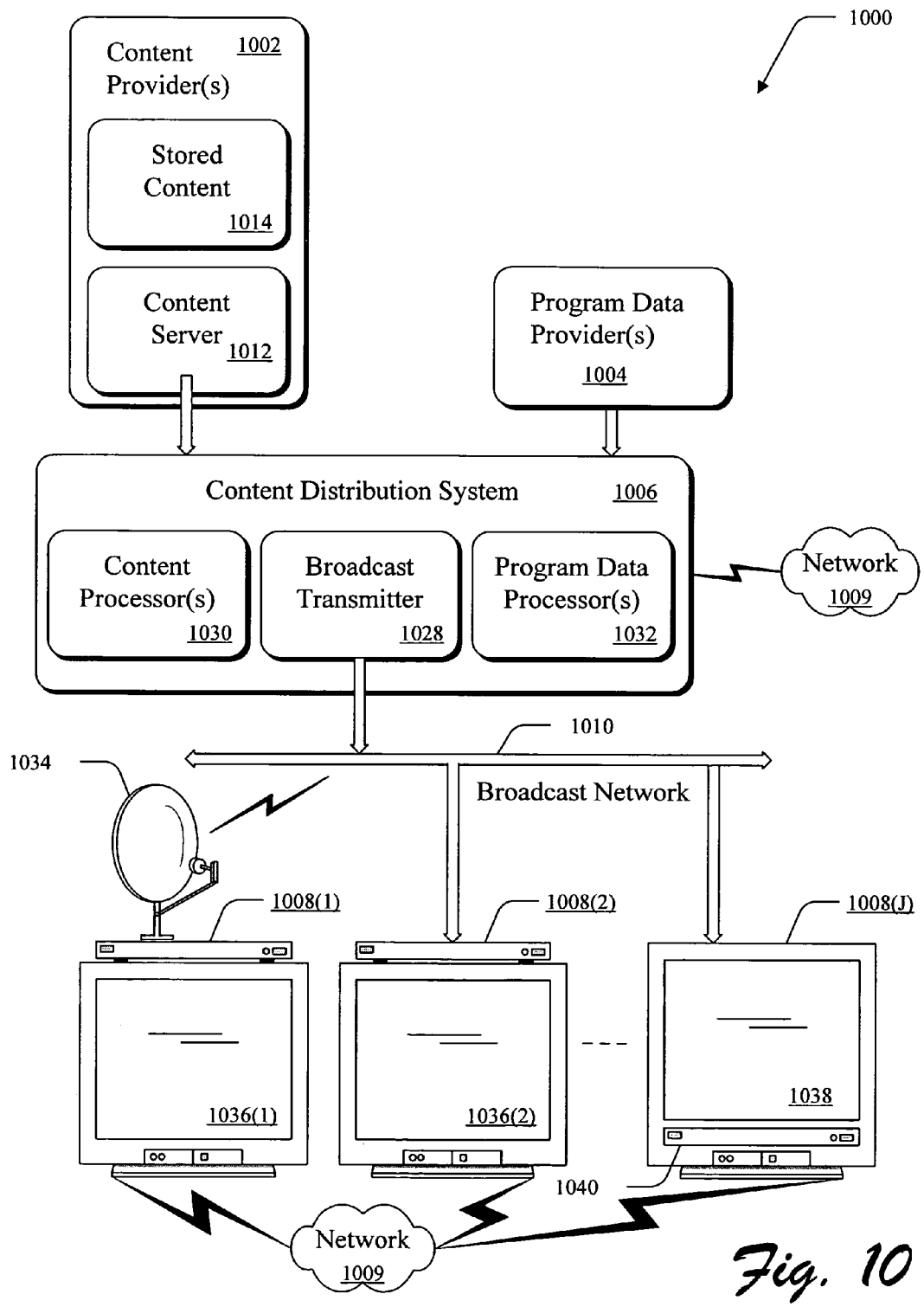
FIG. 10 illustrates an exemplary environment in which a viewer can receive multimedia content via a client device as may be implemented by the systems, apparatus, methods, and computer readable medium described herein.

(1)-102(N) in a television entertainment environment is described in relation to FIG. 10.

Each of the content servers 112-116 and the client 104 include a respective configuration module 126, 128, 130, 132. Each of the configurations modules 126-132, when executed by a respective content server 112-116 or client 104, validates configuration settings of one or more of the applications 118-124 with another one of the applications 118-124. For example, configuration module 128 may be executed by content server 114 to determine whether configuration settings of application 120 are valid with respect to configuration settings of application 124 of the client 104. In another example, configuration module 128 may be executed by content server 114 to determine whether configuration settings of the application 124 of the client 104 are valid with respect to the configuration settings of the application 120 of the content server 114.

Although the configuration modules 126-130 are illustrated as separate from the applications 118-122, the software to implement the configuration modules 126-130 may also be distributed to other aspects of the exemplary environment 100. For example, software components of the configuration module 132 may be located with application 124 and executed by the client 104. Additionally, each of the applications 118-122 may be grouped with other applications to form an application composed of the grouping. For example, separate applications may be configured to provide registration, connection services, and text processing, respectively. The registration, connection services and text processing provided by the applications may be grouped to provide an email application. Further, although the discussion in relation to FIGS. 1-5 describes configuration settings of applications 118-124 which interact over the network 106, i.e. local and remote applications, applications may be located on the same computer, an example of which is illustrated as application 124 and application 134 of client 104.

Figure 2:
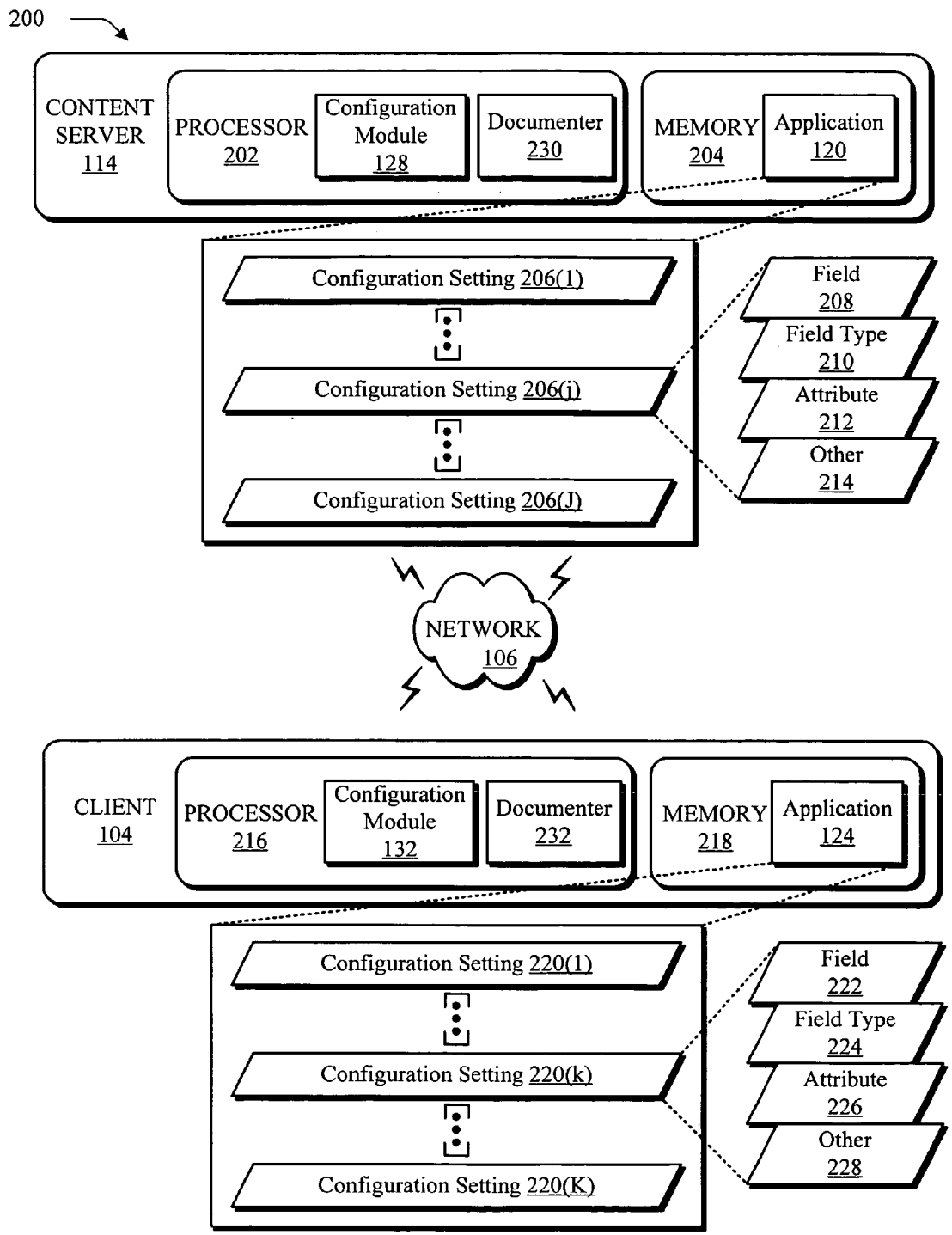
FIG. 2 is an illustration of an exemplary implementation showing the content server and the client of FIG. 1 in greater detail.

FIG. 2 is an illustration of an exemplary implementation 200 showing the content server 114 and client 104 of FIG. 1 in greater detail. The content server 114 includes a processor 202 and memory 204. The content server 114 also includes the configuration module 128 which is illustrated as being executed on the processor 202 and is storable in the memory 204. The application 120 is illustrated as being stored in the memory 204 and is executable on the processor 202.

The application 120 includes a plurality of configuration settings 206(1), ..., 206(j), ..., 206(J). The configuration settings 206(1)-206(J) relate conditions for the execution of the application 120. For example, configuration settings 206(1)-206(J) may indicate data that may be processed by the application 120 and a format for receiving the data for processing. Likewise, configuration settings 206(1)-206(J) may also indicate data that is output by the application 120 and a format of the output data. Configuration settings 206(1)-206(J) may also describe options that are available in the execution of application 120, such as whether particular functionality that is desired in the operation of the application 120 is accessible. For example, the application 120 may include a configuration setting that describes whether software components that provide streaming content from a web page are set "on" or "off". Therefore, the configuration setting may indicate that when the user accesses the web page, whether the user will be able to access the streaming content, such as a web cast.

Each of the configuration settings 206(1)-206(J) may include a variety of information. For example, configuration setting 206(j) may include a field 208, a field type 210, an attribute 212, and other 214 information. The field 208 references a known location in a unit of data, such as a computer-readable instruction, a record, and so on. The field 208 may have a value for the field 208. For instance, the field 208 may be utilized to receive text, such as "user name". The value for "user name" may include "John Doe". Therefore, the field 208 "user name" is a text entry field that has a value "John Doe". The field 208 may also include sub-fields. For instance, the field 208 "user name" may include a first sub-field "first name" and a second sub-field "surname".

The field type 210 is the type of the field 208. In other words, the field type 210 determines the kind of value that may be entered in the field 208. Examples of field types 210 include but are not limited to integer, real number, Boolean, character, constant, array, and string. An integer is a whole number that may be positive, negative, or zero, e.g. 3, −2, or 0. A real number may include a floating-point number, such as numbers that use a decimal point (e.g., 3.14), use scientific notation (e.g., $1.23 \times 10^{11}$), and so on. A Boolean field type may have values of "yes" or "no", or "true" or "false". Character types may include alphanumeric and non-alphanumeric characters (e.g., a, @, $). A constant field type may include a value using alphanumeric and/or non-alphanumeric characters that do not change. An array field type may have a value that includes a number of sub-values arranged in pattern, such as in a list, table, and so on. In an implementation, an array may include a value made of sub-values that may be addressed individually. A string is a sequence of alphanumeric and/or non-alphanumeric characters, such as a binary digit string which is a sequence of binary values. Therefore, as shown in the previous examples, field type 210 determines the type of value that may be entered in the field 208.

The attribute 212 describes a condition for the field 208. For example, the attribute 212 is a declarative tag that corresponds to the field 208 and describes a condition for a value of the field 208, such as by specifying additional information about the field 210. Thus, the attribute 212 provides a way to attach a description of the condition to the field 208. The attribute 212 may be created and attached to the field 208 such that the attribute 212 is retrievable when stored in the memory 204 and is also retrievable in a run-time environment, i.e. when the application 120 is being executed. In an implementation, the attribute 212 may be thought of as an annotation that describes the condition for the field 208 that does not affect the code of the application 120. Therefore, in such an implementation, the attribute 212 describes the field 208 but is not utilized to control the field 208, i.e. does not determine the value for the field 208. For example, the attribute 212 may describe a value constraint of the field 208, but does not provide the actual computer instructions that implement the value constraint. The field type 210, however, determines the type for the field 208 and therefore provides the computer instructions that are used by the application 120.

The attribute 212 may be configured in a variety of ways to describe the condition for the field 208, such as value constraints, default values and textual descriptions. Examples of value constraints include but are not limited to integer float ranges, real number float ranges, value sets, string patterns, cardinality of collections, mandatory values, optional values, and so on. Integer float ranges, for example, may describe a range of integer values. Thus, the attribute 212 "integer float range" may describe a range of values for the field 208 having the field type 210 "integer". Likewise, the attribute 212 "real number float range" may describe a range of values for the field 208 having the field type 210 "real number". Value sets may be utilized to describe values for the field 208 that are valid and are not contiguous, e.g. value set "1-3", "13-15". String patterns may describe patterns that are desired in all or a portion of a string, such as "http://". Cardinality of collections refers to a number of members in the collection. For example, the cardinality of a collection of spaces on a checkerboard is 64, whereas an unbounded collection may include any number of members. Mandatory and optional values, as the names imply, respectively describe mandatory or optional values for the field 208.

The configuration module 128, when executed on the processor 202, may examine computer instructions, from which the application 120 is composed, to obtain the configuration settings 206(1)-206(J). By examining the application 120, the configuration module 128, when executed, may obtain the configuration settings 206(1)-206(J) from the computer instructions of the application 120, itself. Therefore, the configuration module 128 obtains the most up-to-date configuration settings 206(1)-206(J). For example, when a developer is writing the application 120, one or more of the configuration settings 206(1)-206(J) may be changed. Instead of waiting for the developer to update a configuration file manually that describes the changes made, the configuration module 128 may be executed to automatically obtain the latest configuration settings 206(1)-206(J) from the computer instructions of the application 120, itself. Additionally, through examination of the application 120, the configuration module 128 may find configuration settings that otherwise would not have been included in the configuration file, such as omitted through human error and/or failure to realize that the field affects the configuration of the application 120. Therefore, the configuration module 128 may obtain configuration settings 206(1)-206(J) that otherwise might not have been included in the configuration file.

The configuration module 128, when executed on the processor 202, may utilize the attribute 212 to validate the configuration settings 206(1)-206(J) for use with the application 124 of the client 104. For example, the client 104 may also include a processor 216 and memory 218. The application 124 is illustrated as stored in the memory 218 and is executable on the processor 216. The application 124 also includes a plurality of configuration settings 220(1), . . . , 220(k), . . . , 220(K). Each of the configuration settings 220(1)-220(K) may include a field 222, field type 224, attribute 226, and other 228 information as previously described. The configuration module 128, when executed, may validate configuration settings 206(1)-206(J) of the application 120 with corresponding configuration settings 220(1)-220(K) of the application 124. Validation of the configuration settings 206(1)-206(J) may utilize information included in the attribute 212 which describes the condition for the field 208 of each of the configuration settings 206(1)-206(J). Further description of validation utilizing attributes may be found in relation to FIGS. 3 and 4.

The content server 114 and the client 104 may each include a respective documenter 230, 232. The documenters 230, 232, when executed on the respective processors 202, 216, generate a configuration file that includes the respective configuration settings 206(1)-206(J), 220(1)-220(K). For example, the documenter 230, when executed, may generate a configuration file that includes the configuration settings 206(1)-206(J) based on examination of the application 120 as was previously discussed in relation to execution of the configuration module 128. Each of the configuration settings 206(1)-206(J) may include the field 208, the field type 210, the attribute 212 which describes the condition for the field 208, and other 214 information. Thus, the configuration file may be automatically generated through execution of the documenter 230 that includes configuration settings 206(1)-206(J) that are obtained from the code of the application 120 itself.

Although the documenters 230, 232 are illustrated as separate from the applications 120, 124 and the configuration modules 128, 132, the software to implement the documenters 230, 232 may be distributed in a variety of ways. For example, software components of the documenter 230 and the configuration module 128 may be combined such that the documenter 230 and the configuration module 128 share software components that, when executed, examine the application 120. In another example, the documenter 230 may be included as a part of the application 120. Further discussion of execution of the documenters 230, 232 may be found in relation of FIGS. 5 and 6.

Figure 3:
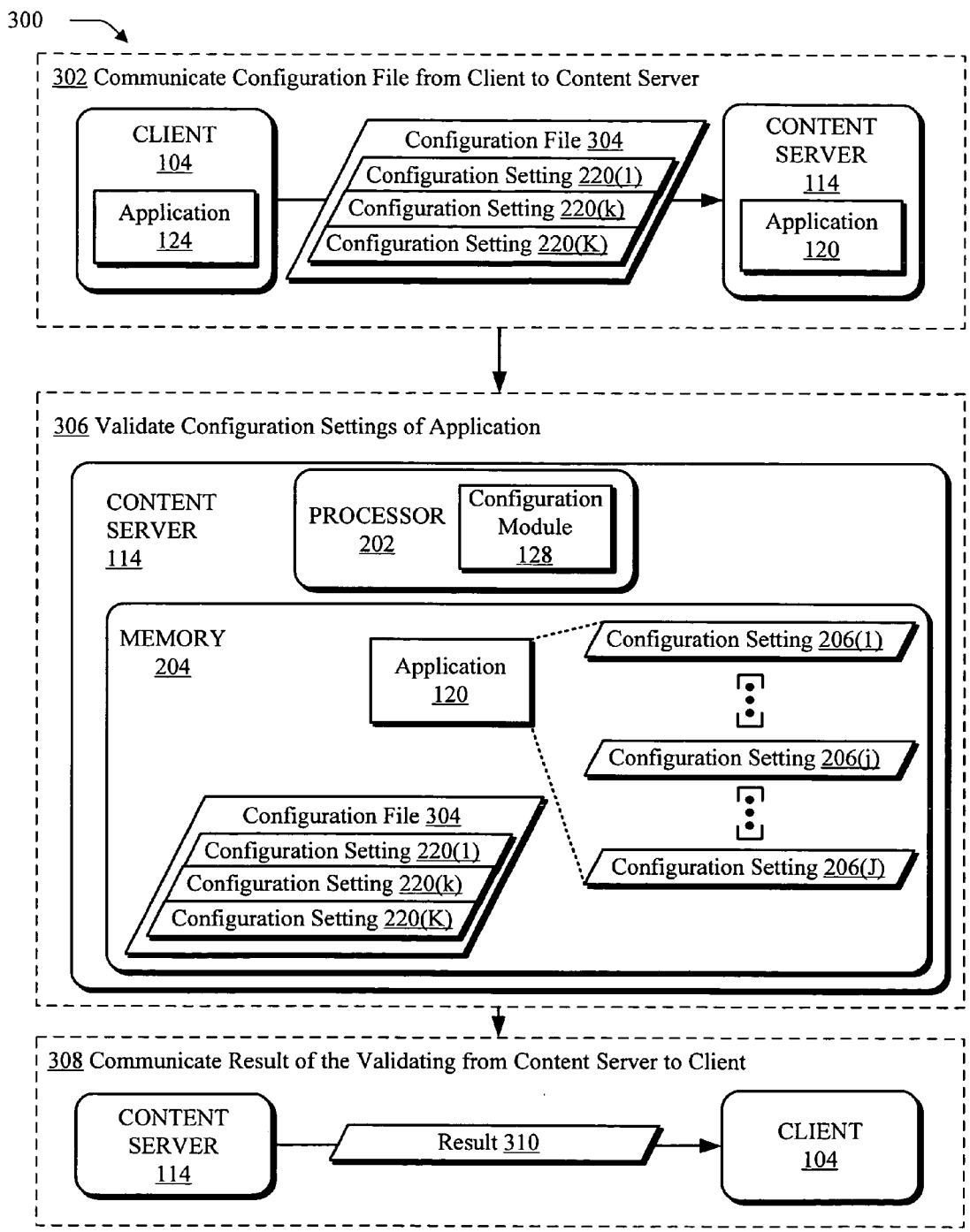
FIG. 3 is a flow chart of a procedure of an exemplary implementation in which a configuration module is executed by the content server of FIG. 2 to validate configuration settings of an application of the client for use with an application of the content server.

FIG. 3 is an illustration of a procedure 300 of an exemplary implementation in which the configuration module 128 is executed by the content server 114 of FIG. 2 to validate configuration settings 220(1)-220(K) of the application 124 of the client 104 for use with the application 120 of the content server 114. At block 302, a configuration file 304 is communicated from the client 104 to the content server 114. The configuration file 304 includes the configuration settings 220(1), . . . , 220(k), . . . , 220(K) of the application 124. In an implementation, each of the configuration settings 220(1)-220(K) may include the field 222, field type 224, attribute 226 and other 228 information as shown in FIG. 2. In another implementation, each of the configuration settings 220(1)-220(K) may include the field 222 and a description of a condition for the field that is similar to the description provided by the attribute 226 but was not obtained from the attribute 226. For example, configuration file 304 may be manually written by a developer to include the field and the description of the condition for the field. Therefore, although the following implementation will discuss the description of the condition as obtained from an attribute 226 of the application 124, a variety of other ways of obtaining the description are contemplated.

At block 306 the configuration settings 220(1)-220(K) of the application 124 of the client 104 are validated for use with the application 120 of the content server 114. As was previously described, the application 120 includes a plurality of configuration settings 206(1), . . . , 206(j), . . . , 206(J). Each of the configuration settings 206(1)-206(J) includes the field 208, field type 210, attribute 212, and other 214 information. The configuration module 128 is executed on the processor 202 of the content server 114 to validate the configuration settings 220(1)-220(K) with respect to corresponding configuration settings 206(1)-206(J). For example, configuration setting 220(k) of application 124 may have the field 222 that corresponds to the field 208 of the configuration setting 206(j) of the application 120. The configuration module 128, when executed, may compare the descriptions of the conditions of the respective configuration settings 206(j), 220(k) with each other to determine whether the described condition for the configuration setting 220(k) is met by the application 120. Further discussion of validation of configuration settings may be found in relation to FIG. 4.

At block 308, a result 310 of the validating of block 306 is communicated from the content server 114 to the client 104. Thus, the configuration module 128 provides a technique for the configuration settings 206(1)-206(J) of the application 120 to be discovered and examined by an external application, i.e. application 124. The configuration file 304 may thus be validated against current configuration settings 206(1)-206(J) of the application 120 of the content server 114 automatically and without human intervention through execution of the configuration module 128. For example, the configuration module 128 may be automatically executed upon receipt of the configuration file 304.

Figure 4:
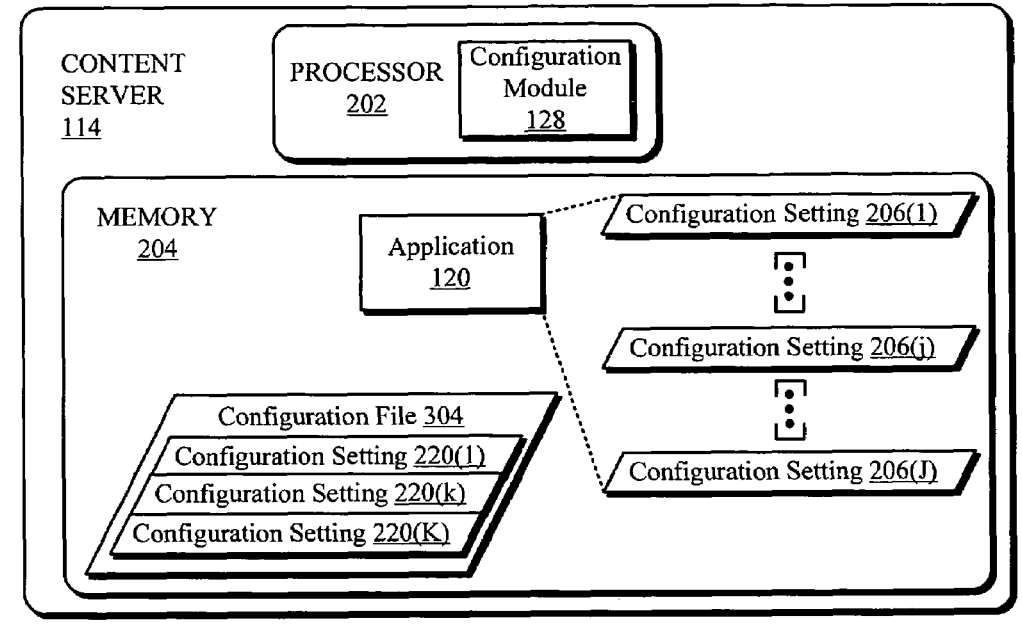
FIG. 4 is a flow chart of a procedure of an exemplary implementation wherein the validating of FIG. 3 is shown in greater detail.
Figure 4:
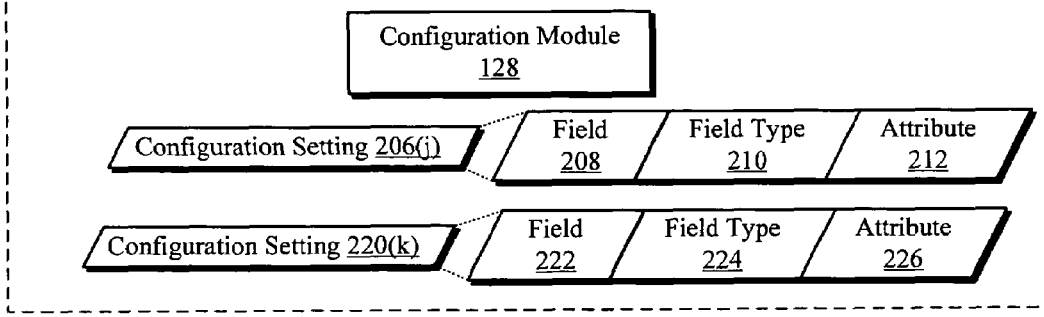

FIG. 4 is an illustration of a procedure 400 of an exemplary implementation wherein the validating of block 306 of FIG. 3 is shown in greater detail. At block 402, computer instructions that compose the application 120 are examined to find a configuration setting that corresponds to one of the configuration settings 220(1)-220(K) of the configuration file 304. The configuration file 304, as was discussed in relation to FIG. 3, includes configuration settings 220(1)-220(K) of the application 124 of the client 104. The configuration module 128 is executed on the processor 202 to read one of the configuration settings 220(1)-220(K) of the configuration file 304. The configuration module 128 then examines the application 120 to find a corresponding configuration setting from the configuration settings 206(1)-206(J) of the application 120. For example, in one implementation, the configuration module 128 examines the computer instructions that compose the application 120 to locate the configuration settings 206(1)-206(J). In another implementation, the configuration module 128 examines a configuration library that is included in the application 120 which includes at least some of the configuration settings 206(1)-206(J). For example, the configuration library may be maintained through execution of the documenter 230 to store configuration settings 206(1)-206(J) in a configuration file, which will be described in greater detail in relation to FIG. 5.

The configuration module 128, when executed, may locate one or more configuration settings from the application 120 that have corresponding fields to find the corresponding configuration setting. For example, the configuration setting 220(k) may have the field 222 "user name". The configuration module 128 may then examine the application 120 to find the field 208 "user name". The field 208 and the corresponding information, such as field type 210, attribute 212, and other 214 information may then be retrieved from the application 120 to supply the configuration setting 206(j) of the application 120.

At block 404, the fields 208, 222 and the respective descriptions are compared, one to another, and validity of the configuration settings 220(k) for use with the application 120 is determined from the comparison. As previously described, the field types 210, 224 determine the type of values for the respective fields 208, 222, such as integer, real number, Boolean, character, constant, array, string, and so on. The attributes 212, 226 describe conditions for the respective fields, such as value constraints, default values and textual descriptions. By executing the configuration module 128, validity of the configuration settings 220(1)-220(K) may be determined with respect to the configuration settings 206(1)-206(J) of the application 120 based on a comparison of the fields 208, 222, field types 210, 224, and descriptions of the conditions for the respective fields 208, 222 that are obtained from the respective attributes 212, 226.

The configuration module 128, for instance, may compare configuration setting 220(k) with configuration setting 206(j) that was found through examination of the application 120 at block 402. Configuration settings 220(k), 206(j), for instance, may have corresponding fields 208 that specify "user name". The configuration module 128 may compare the field types 210, 224 with each other to determine whether the type that is determined by the field type 224 is valid with respect to the field type 210 of configuration setting 206(J). For instance, field types 210, 224 may each specify a "string", and therefore the configuration module 128 may determine based on this comparison that the field types 210, 224 are valid with respect to each other. Thus, the configuration module 128 determines that field type 224 for configuration setting 220(k) is valid for use with the application 120.

The configuration module 128, when executed, may also determine validity of the configuration setting 220(k) for use with the application 120 based on a description of a condition for the field 222 that is obtained from the attribute 226. As was previously discussed, the attribute 226 may be configured in a variety of ways to provide a description of the condition for the field 222, such as a value constraint, a default value and a textual description. The description provided by the attribute 226 of the configuration setting 220(k) from the configuration file 304 may be compared with the description provided by the attribute 212 of the configuration setting 206(j) of the application 120. Based on the comparison, the configuration module 128 determines if the described condition for the field 222 is valid for use with the application 120.

The attribute 212 of configuration setting 206(j), for example, may describe a condition for the field 208 that is a default value, such as a value "true" for a Boolean field type 210 for the field 208. The configuration module 128, when executed, compares the description of the default value for the field 208 obtained from the attribute 212 with a description from the attribute 226 of the configuration setting 220(k). The attribute 226, for instance, may describe a default value of "false" for the Boolean field type 224 for the field 222. Attribute 212 of configuration setting 206(j), however, may describe a default value of "true". Based on the comparison, the configuration module 128 determines that the configuration setting 220(k) is not valid with respect to the configuration setting 206(j). In other words, the comparison indicates that the description of the condition from attribute 226 of configuration setting 220(k) is not met by the description of the condition from attribute 212 of configuration setting 206(j). Therefore, the configuration module 128 in this instance determines that the configuration setting 220(k) is not valid for use with the application 120.

Value constraints that are described by the attributes 212, 226 may also be utilized to determine validity of the configuration setting 220(k) for use with the application 120. Examples of value constraints include but are not limited to integer float ranges, real number float ranges, value sets, string patterns, cardinality of collections, mandatory values, optional values, and so on. In a first example, the configuration module 128 is executed to utilize a description of an integer float range to determine validity of field 222 with respect to field 208. Attribute 212, for example, may describe an integer float range from "1-100" for field 208. Attribute 226, however, may describe an integer float range from "1-50" for field 222 of configuration setting 220(k). A variety of actions may be taken by the configuration module 128 in such an instance. For example, the configuration module 128 may utilize logic to determine that values received from application 124 of the client 104 of FIG. 2 fall within the range of values that may be utilized by field 208 of the application 120. Therefore, the configuration module 128 may indicate that the configuration setting 220(k) is valid for use with the application 120 such that the values described by the configuration setting 220(k) may be accepted by the application 120. In another example, one-to-one correspondence of the described integer float ranges may be desired, and therefore the configuration module 128 may indicate that the configuration setting 220(k) is not valid for use with the application 120. Similar functionality may also be employed when the attributes 212, 226 describe real number float ranges and/or value sets.

The configuration module 128 may also determine validity based on the attribute 226 when describing a condition that relates a string pattern for the value of the field 222. For example, the attribute 212 of the configuration setting 206(j) of the application 120 may describe a pattern for a beginning portion of a string for the field 208, such as "http://". The attribute 226 that describes the field 222 of the configuration setting 220(k) may also describe a condition in which the value is a string that will begin with "http://". Therefore, the configuration module 128 may determine that the configuration setting 220(k) is valid for use with the application 120 because the condition described by attribute 226 is met by the application 120.

Validity of the configuration setting 220(k) may also be based on the attribute 226 when describing the cardinality of a collection for the value of the field 222. For example, attribute 226 may describe that four members of a collection of values for the field 222 are to be provided. Likewise, attribute 212 may describe that four members of a collection of values for the field 208 are expected. Because the attributes 212, 226 describe matching cardinality, the configuration module 128 determines that the configuration setting 220(k) is valid for use with the application 120.

Mandatory and optional values that are described by the attributes 212, 226 may also be utilized by the configuration module 128 to determine validity of the configuration setting 220(k) for use with the application 120. For example, if the attributes 212, 226 describe mandatory values for the respective fields 208, 222, the descriptions provided by the attributes 212, 226 may be compared to determine one-to-one correspondence of the described values. If the attributes 212, 226 describe optional values for the respective fields 208, 222, the descriptions provided by the attributes 212, 226 may be compared to determine whether the optional values correspond. For example, the field 222 "user name" may include optional values for a sub-field "middle name". The attribute 226 may describe an optional value for the optional sub-field "middle name" that is included in the field 222 "user name". If the attribute 212 does not describe an optional value "middle name" for the field 208, the configuration module 128 may determine that configuration setting 220(k) is not valid for use with the application 120.

The configuration module 128, when executed, may also determine validity of the configuration setting 220(k) for use with the application 120 based on a textual description that is provided by the attribute 226. For example, the attribute 226 may describe a unit for the value of the field 222, such as millimeters, seconds, dollars, and so forth. The configuration module 128, when executed, may compare units that are described by the attribute 212 for values of the field 208 with units that are described by the attribute 226 for values of the field 222 to determine validity of the respective configuration settings 206(j), 220(k).

The configuration module 128, when executed, may also employ logic to determine validity of configuration settings based on textual descriptions that are provided by the attributes 212, 226. The attributes 212, 226, for example, may describe a meaning, e.g. a contemplated use, of the respective fields 208, 222. The attributes 212, 226 may also provide one or more examples. For instance, attribute 226 may describe that the value for the field 222 "user name" is to be used for logon purposes, and therefore a single name is to be included in the value the field 222 that may include letters and numbers, but no spaces. The attribute 226 may also give an example of such a value, such as "john_d747". However, attribute 212 may describe that the value for the field 208 "user name" is to be used for billing purposes, and therefore a first and last name is to be included in the value the field 208, and supply an example "John Doe". Through comparison of the meanings and examples that are included in the textual descriptions, it may thus be determined through execution of the configuration module 128 that conditions of configuration setting 220(k) are not met by application 120.

The previous procedures 300, 400 described the use of attributes to validate configuration settings through execution of the configuration module 128. Similar functionality may also be provided through execution of the documenter 230 of FIG. 2 to generate a configuration file having configuration settings that include descriptions obtained from attributes included the application 120, an example of which is discussed in the following implementation.

Figure 5:
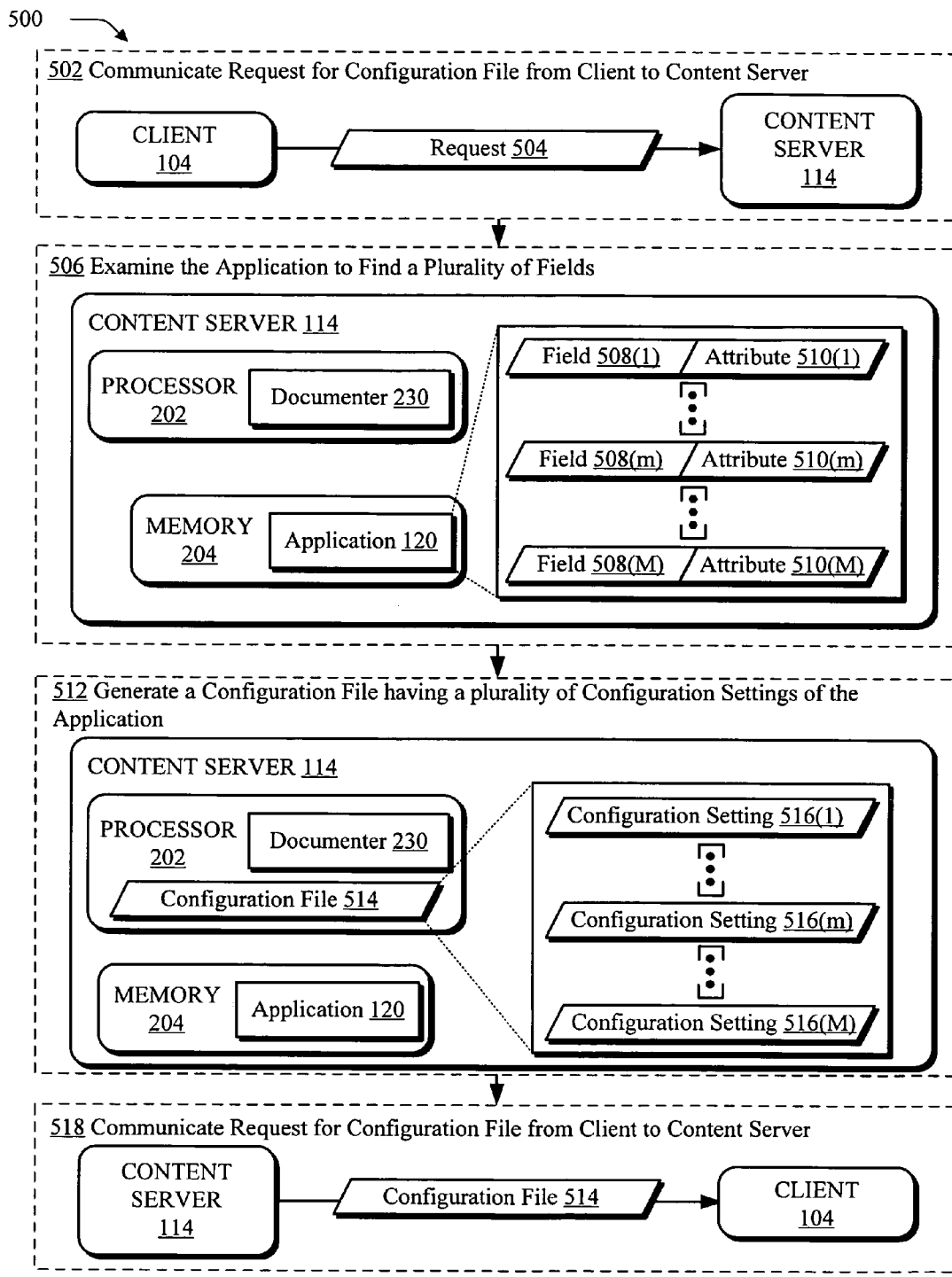
FIG. 5 is a flow chart of a procedure in an exemplary implementation in which a documenter is executed by the content server of FIG. 2 to generate a configuration file.

FIG. 5 is an illustration of a procedure 500 in an exemplary implementation in which the documenter 230 of FIG. 2 is executed by the content server 114 to generate a configuration file. At block 502, a request 504 for a configuration file is communicated from the client 104 to the content server 114. At block 506, the documenter 230 is executed on the processor 202 to examine the application 120 that is stored in the memory 204 to find a plurality of fields 508(1), . . . , 508(m), . . . , 508(M). Each of the plurality of fields 508(1)-508(M) has one or more respective attributes 510(1)-510(M). For example, as illustrated in FIG. 5, field 508(m) has a respective attribute 510(m) that describes the field 508(m). Each of the fields 508(1)-508(M) may also have multiple attributes.

The documenter 230 may be executed in response to the request 504 to find a description of a current state of the fields 508(1)-508(M). For example, the application 120 may be written by a group of developers. To get the most up-to-date fields 508(1)-508(M) and the respective attributes 510(1)-510(M), the documenter 230 is executed when the request 504 is received.

At block 512, a configuration file 514 is generated through execution of the documenter 230. The configuration file 514 has a plurality of configuration settings 516(1)-516(M) of the application 120 based on the examining that was performed at block 506. Each of the configuration settings 516(1)-516(M) may include one of the fields 508(1)-508(M) and a description of the field that was obtained from the respective attribute 510(1)-510(M). Through execution of the documenter 230, a configuration file 514 is provided which has attributes 510(1)-510(M) that accurately reflects the current state of the computer instructions that compose the application 120. For example, the attributes 510(1)-510(M) may be specified by developers when writing the application 120. Therefore, the attributes 510(1)-510(M) may be written by the developer that wrote the code of the application 120 which includes the corresponding field that is being described. The configuration file 514 may be configured in a variety of ways, such as in a computer-readable format, as a human-readable configuration document, and so on, additional examples of which are discussed in relation to FIG. 7.

At block 518, the configuration file 514 is communicated from the content server 114 to the client 104. Although the configuration file 514 is illustrated as being communicated to the client 104, the configuration file 514 may also be stored on the content server 114 as a configuration library. The configuration file 514, for instance, may be periodically generated and stored in the memory 204 as a configuration library through execution of the documenter 230. The documenter 230 may be executed at a predetermined point in time, executed when one or more attributes 510(1)-510(M) of the application 120 are changed, and so on. For example, the documenter 230 may monitor the computer instructions of the application 120 and update the configuration file automatically upon detecting a change in one or more configuration settings.

Figure 6:
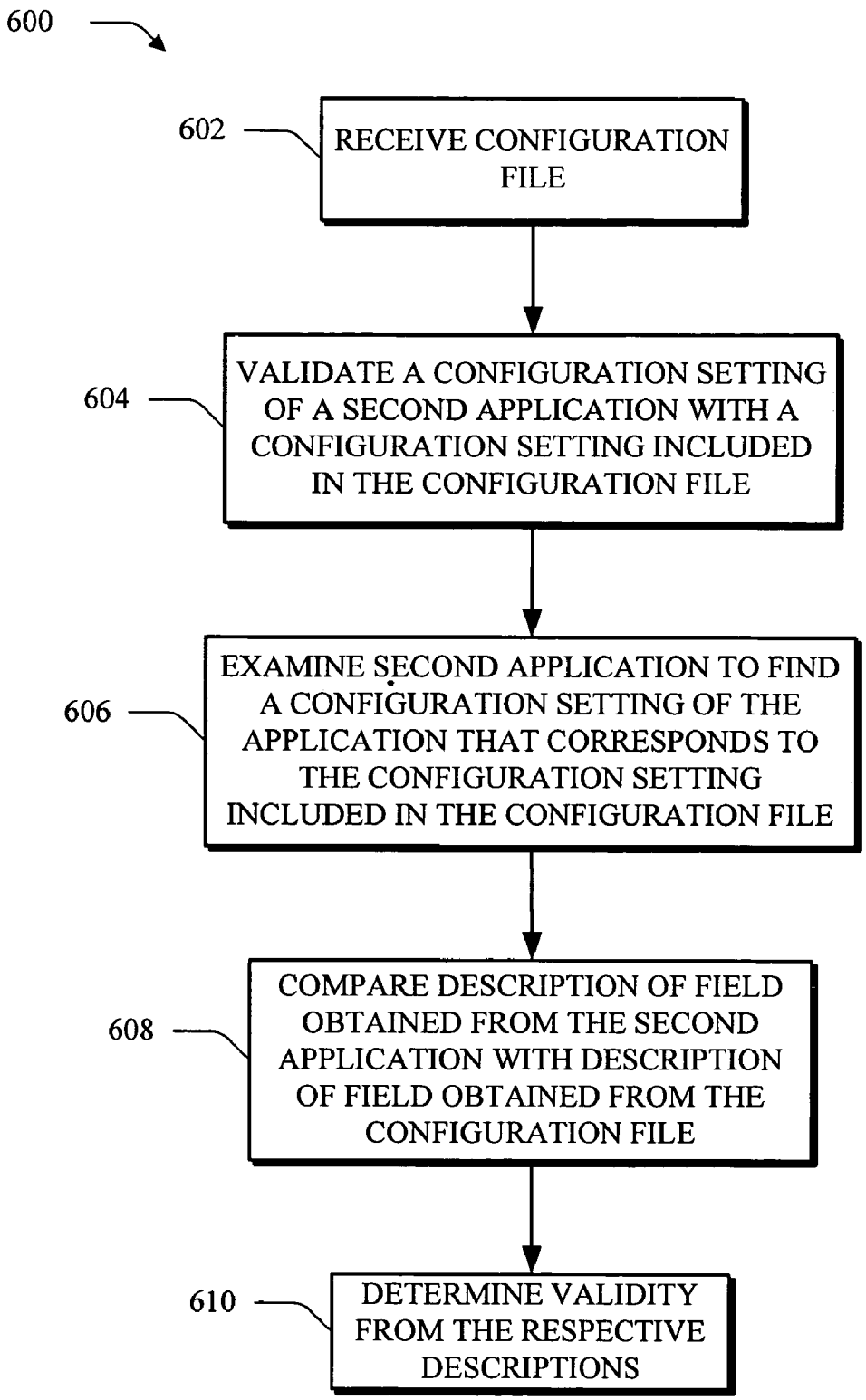
FIG. 6 is a flow chart depicting an exemplary procedure in which validity of a second application for use with a first application is determined based on an attribute that is included in the second application.

FIG. 6 is a flow chart depicting an exemplary procedure 600 in which validity of a second application for use with a first application is determined based on an attribute that is included in the second application. Although the previous implementations discussed the determination of validity of a first application, e.g. application 124, for use with a second application, e.g. application 120, by comparing descriptions of conditions, the second application, e.g. application 120, may also be verified for use with the first application, e.g. application 124. For example, in the implementation described in relation to FIGS. 3 and 4, the configuration module 128 of the content server 114 was executed to determine validity of the configuration settings 220(1)-220(K) of application 124 for use with application 120. In another implementation, the configuration module 128 may be executed to determine whether the configuration settings 206(1)-206(J) are valid for use with application 124 of the client 104.

At block 602, for example, a configuration file that includes configuration settings of a first application is received by a configuration module. The configuration file may originate from a variety of locations, such as from another application that is included on the same computer that executes the configuration module, from another computer over a network, and so on. For example, the configuration file may be received from application 134 by the configuration module 132 shown in FIG. 1. The configuration module 132 may be executed by the client 104 of FIG. 1 to validate configuration settings of the application 124 with respect to application 134. In another example, the configuration module 132 is executed by the client 104 to validate configuration settings of application 124 with respect to application 120 of content server 114 of FIG. 1.

At block 604, a configuration setting of a second application is validated with respect to a configuration setting that is included in the configuration file. Validating may be performed in a variety of ways. For example, at block 606 computer instructions of the second application are examined to find a configuration setting of the second application that corresponds to one of the configuration settings included in the configuration file. The corresponding configuration setting may be found, for instance, by matching the fields of the configuration settings, one to another.

At block 608, a description of the field of the configuration setting that was obtained from the configuration file is compared with a description of the field of the configuration setting that was obtained from the second application. The description of the field is obtained from the second application by examining the attribute that describes the field. As previously stated, the attribute provides a description of a condition for the respective field. At block 610, the validity of the configuration setting of the second application is determined from the respective descriptions. The configuration setting obtained from the configuration file, for instance, may describe permissible characters that may be entered for the field "letter grade", such as letters "A", "B", "C", "D", and "F". The attribute of the second application, however, may specify letters "A", "B", "C", "D", "E" and "F" for values of a field "letter grade". Therefore, the configuration module may determine that the second application may supply a value "E" that is not supported by the first application as recited by the configuration file. Thus, the second application is not valid for use with the first application. In this way, the second application may be validated for use with the first application through execution of a configuration module by a computer that stores the second application which is being validated.

Figure 7:
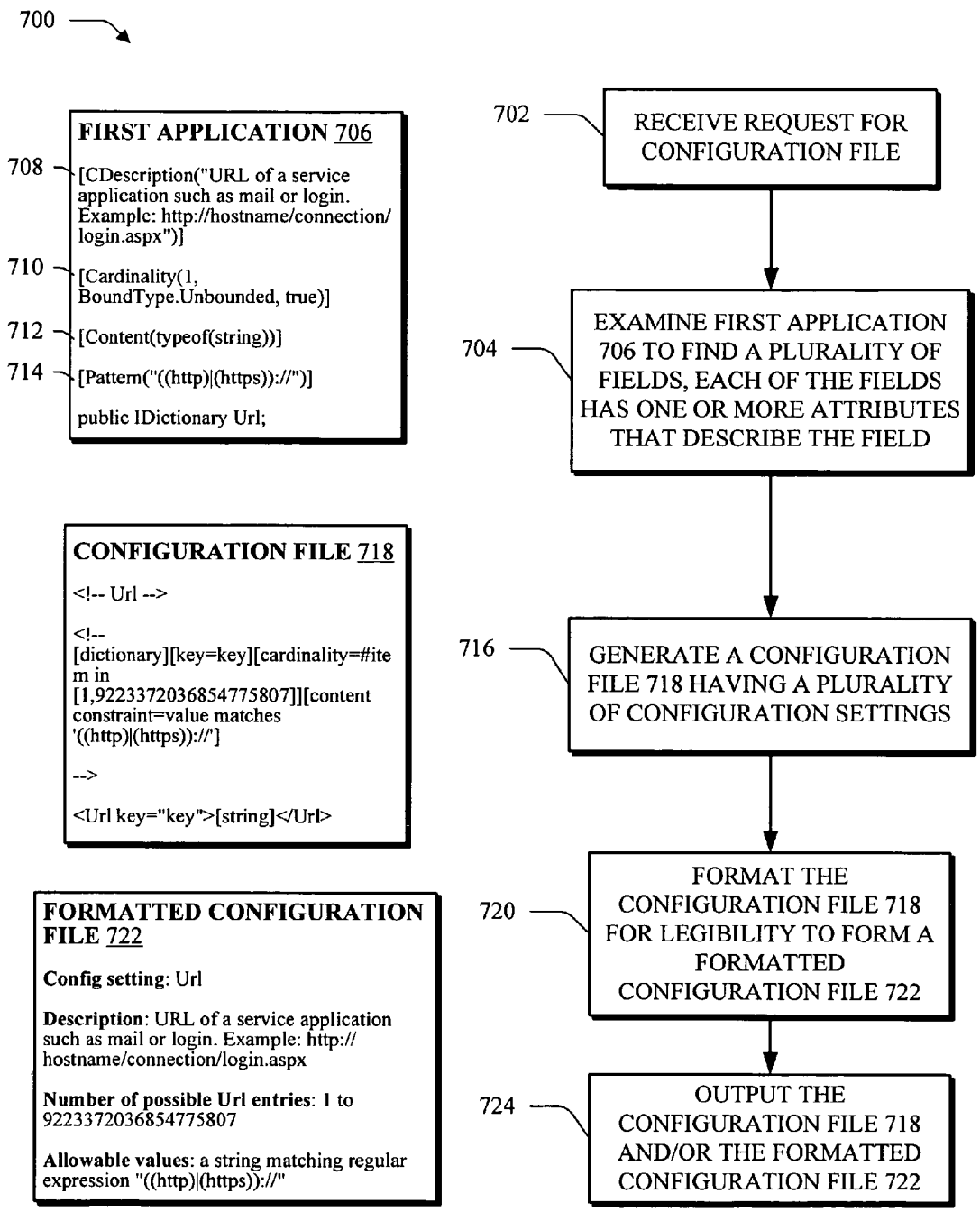
FIG. 7 is a flow chart depicting an exemplary procedure in which a documenter of FIG. 2 is executed to generate a configuration file that is formatted for legibility.

FIG. 7 is a flow chart depicting an exemplary procedure 700 in which the documenter 230 of FIG. 2 is executed to generate a configuration file that is formatted for legibility. At block 702, a request is received for a configuration file. At block 704, computer instructions of a first application 706 are examined in response to the request to find a plurality of fields. Each of the fields has one or more attributes that describe the field by describing a condition for the field. For example, four attributes are shown that describe a field in the first application 706. The first attribute 708 is a textual description that describes a condition for the use of the field. The second attribute 710 describes a condition for the cardinality of the value of the field. The third attribute 712 describes a condition for the type of the field, and the fourth attribute 714 describes a condition for a string pattern of the field.

At block 716, a configuration file 718 is generated that has a plurality of configuration settings. Each of the configuration settings includes one of the descriptions obtained from one of the first, second, third or fourth attributes 708-714. At block 720, the configuration file 718 is formatted for legibility to form a formatted configuration file 722. For example, descriptions contained in the configuration file 718 may be organized and given headers to describe the configuration settings. Similar descriptions may be grouped when organized to further increase the legibility of the formatted configuration file 722. For example, a textual description of the meaning of the field that is supplied by an attribute and a textual description of an example of the field may be grouped together through execution of the documenter 230 of FIG. 2.

At block 724, the configuration file 718 and/or the formatted configuration file 722 is output. For example, the formatted configuration file 722 may be utilized by a developer when writing computer instructions for the first application 706. In another example, the configuration file 718 is utilized to validate configuration settings in the computer instructions of the first application 706 with respect to a second application through execution of the configuration module of FIG. 2, as will be described in greater detail with regards to FIG. 8.

Figure 8:
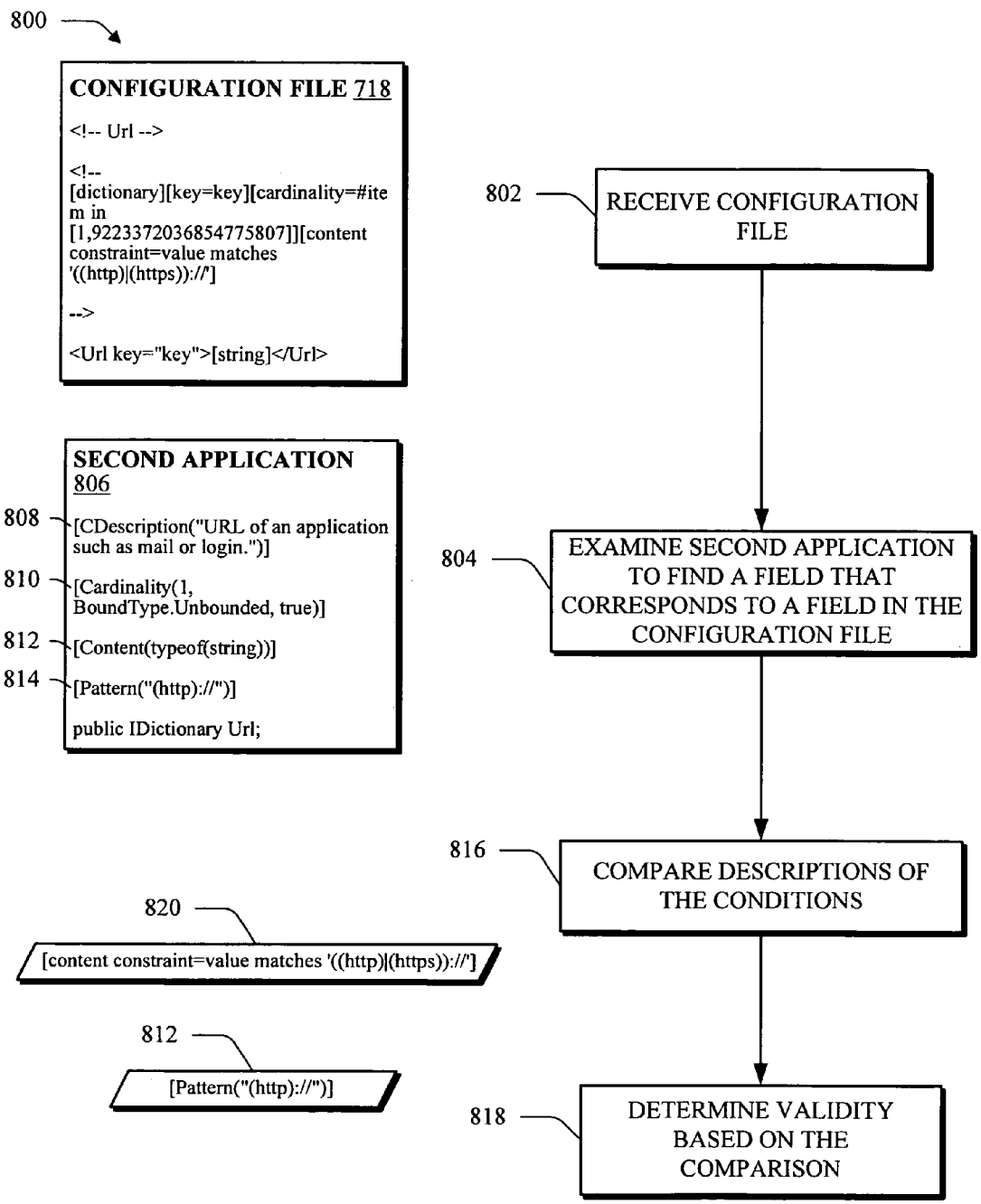
FIG. 8 is a flow chart depicting an exemplary procedure in which the configuration file generated by the procedure of FIG. 7 is utilized to validate configuration settings.

FIG. 8 is a flow chart depicting an exemplary procedure 800 in which the configuration file 718 generated by the procedure 700 of FIG. 7 is utilized to validate configuration settings. At block 802, the configuration file 718 is received by a configuration module. For example, the first application 706 of FIG. 7 and the configuration module may both be stored on the same computer. In another example, the configuration file 718 is communicated over a network.

At block 804, a second application 806 is examined to find a field that corresponds to a field in the configuration file 718. Attributes that describe the field are read from the second application, such as a first, second, third and fourth attributes 808, 810, 812, 814. The first, second, third and fourth attributes 808-814 describe conditions for the field, such as by providing a textual description, cardinality, content type description, and string pattern, respectively.

At block 816, the respective descriptions of the conditions are compared and at block 818, validity is determined based on the comparison. For example, a configuration setting 820 from the configuration file 718 may describe string patterns that are supported for the field as "http://" or "https://". The configuration setting 820 was obtained from the fourth attribute 714 of the first application 706 in FIG. 7. The fourth attribute 814 from the second application 806, however, may describe a string pattern of "http://". Thus, the second application 806 supports values having "https://" for the field, and the first application 706 of FIG. 7 supports values of both "http://" or "https://". Therefore, configuration settings of the first application 706 may not be valid for use with the second application 806 in that the first application 706 may provide a value having a string pattern that is not supported by the second application 806. Configuration settings of the second application 806, however, may be valid for use with the first application 706 in that the second application 806 may provide a value having a string pattern that is supported by the first application 706. Thus, configuration settings of the second application 806 may be validated for use with the first application 706, and vice versa.

Figure 9:
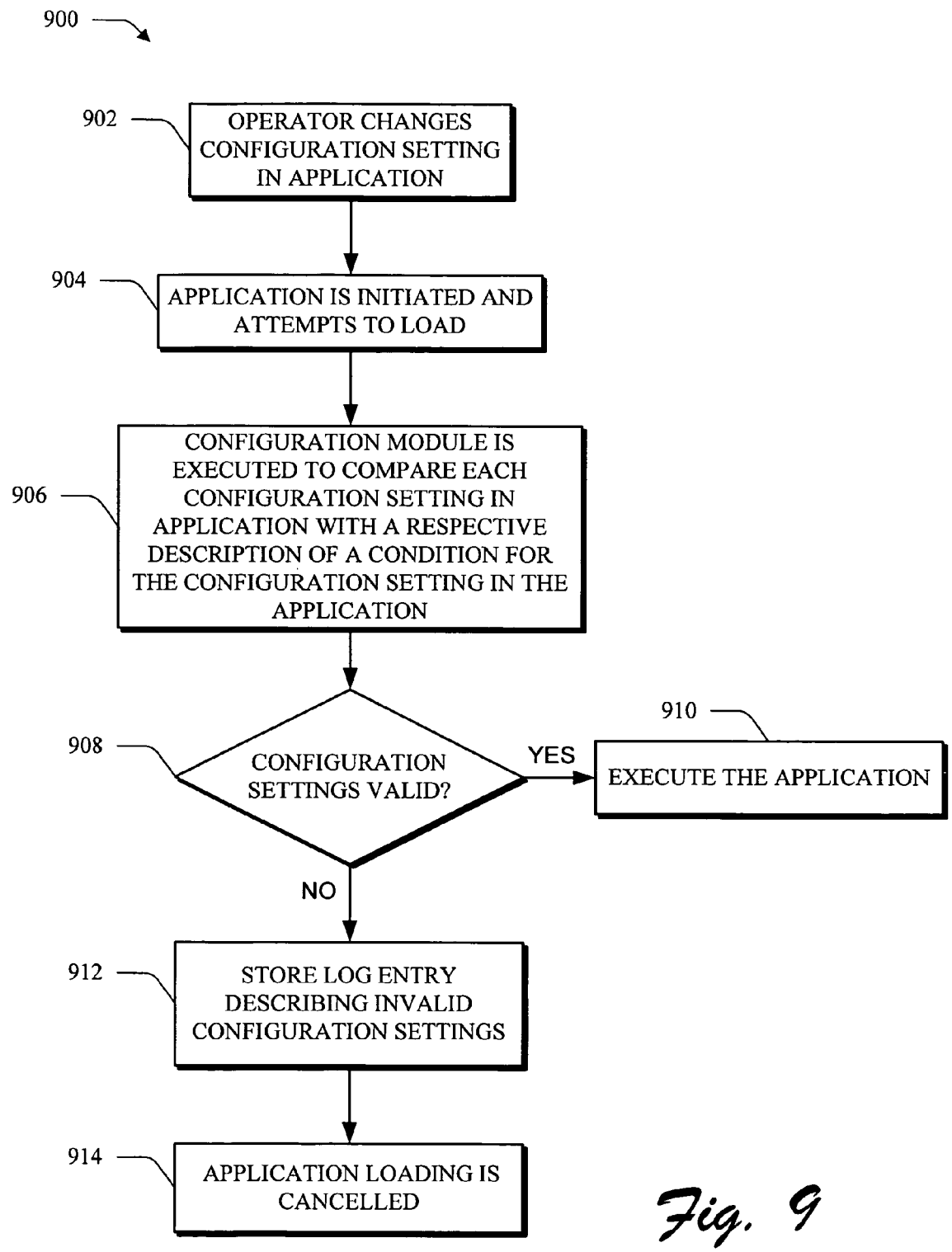
FIG. 9 is a flow chart depicting an exemplary procedure in which the configuration module is executed to validate current configuration settings of an application with descriptions of conditions of the configuration settings that are included in the application.

FIG. 9 is a flow chart depicting a procedure 900 in an exemplary implementation in which a configuration module is executed to validate current configuration settings of an application with descriptions of conditions of the respective configuration settings that are included in the application. In the previous implementation, the configuration module was executed to determine whether the configuration settings of an application were valid for use with the configuration settings of another application, and vice versa. In another implementation, the configuration module is executed to validate current configuration setting of an application with a description of conditions of that application that were obtained from attributes in the application itself. The descriptions of conditions for fields included in the application may be utilized to validate configuration settings of the application.

At block 902, an operator changes a configuration setting in an application. For example, the operator may change a configuration setting "check subscription" of an application to have a default value of "false". At block 904, the application is initiated and attempts to load for execution on a computer. At block 906, the configuration module is executed by the computer to compare each configuration setting in the application with a respective description of a condition for the configuration setting in the application. Continuing with the previous example, the configuration module may examine the application and find a description of the configuration setting "check field" from a corresponding attribute. The attribute describes that the configuration setting "check field" has a type "Boolean" and has a corresponding condition in which the default value is "false". At decision block 908, a determination is made as to whether the configuration settings are valid, and if yes, the application is executed at block 910.

In the previous example, however, the compared default value "true" that was changed by the operator in block 902 is not valid at decision block 908 with respect to the condition described by the attribute. Therefore, at block 912 a log entry is stored in a log that describes invalid configuration settings. At block 914, the loading of the application is cancelled. In this way, application loading failure may indicate to the operator that the application includes one or more invalid configuration settings. The operator may then locate each invalid configuration setting by accessing the log and reading the log entry of block 912.

Exemplary Environment

FIG. 10 illustrates an exemplary environment 1000 in which a viewer may receive content via a client as may be implemented by the systems, apparatus, methods, and computer readable medium described herein. Exemplary environment 1000 is a television entertainment system that facilitates distribution of content to multiple viewers. The environment 1000 includes one or more content providers 1002, one or more program data providers 1004, a content distribution system 1006, and multiple clients 1008(1), 1008(2), . . . , 1008(J) coupled to the content distribution system 1006 via a broadcast network 1010. By way of analogy, environment 1000 corresponds to environment 100, content providers 1002 may correspond to content providers 102(1)-102(N), and clients 1008(1)-1008(J) may correspond to client 104. Each client 1008 (1 through J) and the content distribution system 1006 are in communication with a network 1009 that provides two-way communications there between. The content distribution system 1006 services requests from the clients 1008(1)-1008(J) by executing applications, such as applications 118-122 shown in FIG. 1.

Content provider 1002 includes a content server 1012 and stored content 1014, such as movies, television programs, commercials, music, and similar audio and/or video content. Content server 1012 controls distribution of the stored content 1014 from content provider 1002 to the content distribution system 1006. For example, the content server 1012 may broadcast the stored content 1014 to one or more of the clients 1008(1)-1008(J) in response to a request received from the clients 1008(1)-1008(J). Additionally, content server 1002 controls distribution of live content (e.g., content that was not previously stored, such as live feeds) and/or content stored at other locations to the content distribution system 1006.

Program data provider 1004 stores and provides an electronic program guide (EPG) database. Program data in the EPG includes program titles, ratings, characters, descriptions, actor names, station identifiers, channel identifiers, schedule information, and so on. The terms "program data" and "EPG data" are used interchangeably throughout this discussion, both of which may be thought of as forms of content that may be requested by one or more of the clients 1008(1)-1008(J).

The program data provider 1004 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The program data provider 1004 controls distribution of the published version of the program data to the content distribution system 1006 using, for example, a file transfer protocol (FTP) over a TCP/IP network (e.g., Internet, UNIX, etc.). Further, the published version of the program data can be transmitted from program data provider 1004 via a satellite 1034 directly to a client 1008 by use of a satellite dish 1034.

Content distribution system 1006 includes a broadcast transmitter 1028, one or more content processors 1030, and one or more program data processors 1032. Broadcast transmitter 1028 broadcasts signals, such as cable television signals, across broadcast network 1010. Broadcast network 1010 can include a cable television network, RF, microwave, satellite, and/or data network, such as the Internet, and may also include wired or wireless media using any broadcast format or broadcast protocol. Additionally, broadcast network 1010 can be any type of network, using any type of network topology and any network communication protocol, and can be represented or otherwise implemented as a combination of two or more networks. The components of the content distribution system 1006 and content provider 1004 may be arranged in a variety of ways. For example, although broadcast transmitter 1028 is illustrated as within the content distribution system 1006, the broadcast transmitter may also be included with the content server 1012.

Content processor 1030 processes the content received from content provider 1002 prior to transmitting the content across broadcast network 1008. Similarly, program data processor 1032 processes the program data received from program data provider 1004 prior to transmitting the program data across broadcast network 1010. A particular content processor 1030 may encode, or otherwise process, the received content into a format that is understood by the multiple clients 1008(1), 1008(2), ..., 1008(J) coupled to broadcast network 1010. Although FIG. 10 shows a single content provider 1002, a single program data provider 1004, and a single content distribution system 1006, exemplary environment 1000 can include any number of content providers and/or program data providers coupled to any number of content distribution systems.

Content distribution system 1006 is representative of a headend service with one or more carousels that provides content to multiple subscribers. For example, the content may include a result of processing that was performed in response to a request sent by one or more of the clients 1008(1)-1008(J). Each content distribution system 1004 may receive a slightly different version of the program data that takes into account different programming preferences and lineups. The program data provider 1004 creates different versions of EPG data (e.g., different versions of a program guide) that include those channels of relevance to respective headend services, and the content distribution system 1006 transmits the EPG data to the multiple clients 1008(1), 1008(2), ..., 1008(J). In one implementation, for example, content distribution system 1006 utilizes a carousel file system to repeatedly broadcast the EPG data over an out-of-band (OOB) channel to the clients 1008.

The carousel file system may also be utilized to repeatedly broadcast the configuration file 514 that was generated by the documenter 230 shown in FIG. 5 over an out-of-band (OOB) channel to the clients 1008. Thus, the clients 1008 may be provided with current configuration settings of applications that are executed on the content server 1012.

Clients 1008 can be implemented in a number of ways. For example, a client 1008(1) receives broadcast content from a satellite-based transmitter via satellite dish 1034. Client 1008(1) is also referred to as a set-top box or a satellite receiving device. Client 1008(1) is coupled to a television 1036(1) for presenting the content received by the client (e.g., audio data and video data), as well as a graphical user interface. A particular client 1008 can be coupled to any number of televisions 1036 and/or similar devices that can be implemented to display or otherwise render content. Similarly, any number of clients 1008 can be coupled to a single television 1036.

Client 1008(2) is also coupled to receive broadcast content from broadcast network 1010 and provide the received content to associated television 1036(2). Client 1008(J) is an example of a combination television 1038 and integrated set-top box 1040. In this example, the various components and functionality of the set-top box are incorporated into the television, rather than using two separate devices. The set-top box incorporated into the television may receive broadcast signals via a satellite dish (similar to satellite dish 1034) and/or via broadcast network 1010. In alternate implementations, clients 1008 may receive broadcast signals via network 1009, such as the Internet, or any other broadcast medium.

Each client 1008 executes one or more applications, such as the applications 124, 134 shown in FIG. 1. The applications may enable a television viewer to navigate through an onscreen program guide, locate television shows of interest to the viewer, and purchase items, view linear programming as well as pay per view and/or video on demand programming. As such, one or more of the program data providers 1004 can include stored on-demand content, such as Video On-Demand (VOD) movie content, and near VOD such as pay per view movie content. The stored on-demand and near on-demand content can be viewed with a client 1008 through an onscreen movie guide, for example, and a viewer can enter instructions to stream a particular movie, or other stored content, down to a corresponding client 1008.

A variety of exemplary procedures 300, 400, 500, 600, 700, 800 have been described which may be embodied in computer-readable media. Computer-readable media can be any available media that can be accessed by a computer and includes both volatile and nonvolatile media, removable and non-removable media. By way of example, and not limitation, computer-readable media may comprise computer storage media and communication media. Computer readable-media also includes communication media, which typically embodies computer-readable instructions, data structures, program modules or other data in a modulated data signal such as a carrier wave or other transport mechanism and includes any information delivery media. By way of example, and not limitation, communication media includes wired media such as a wired network or direct-wired connection and wireless media such as acoustic, RF, infrared and other wireless media. Combinations of any of the above should also be included within the scope of computer readable media.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising validating a configuration setting of a first application for use with a second application, wherein:

the configuration setting including a first field and a first description of a first condition for the first field;

the second application is composed of computer instructions, the computer instructions having an attribute, the attribute providing a second description of a second condition for a second field; and the validating includes:

if the first field corresponds to the second field, then comparing the first description of the first condition with the second description of the second condition to determine whether the first condition is met by the second condition; and if met, then determining that the configuration setting is valid for use with the second application.

2. A method as described in claim 1, wherein the first and second conditions are value constraints selected from the group consisting of:

an integer range;

a float range;

a value set;

a string pattern;

cardinality of a collection;

a mandatory value; and an optional value.

3. A method as described in claim 1, wherein the first and second conditions are default values.

4. A method as described in claim 1, wherein the first and second conditions are textual descriptions selected from the group consisting of a description of units in which the respective first and second fields are expressed;

a description of meanings of the respective first and second fields; and an example of values of the first and second fields.

5. A method as described in claim 1, wherein the attribute:
is a declarative tag that that may be retrieved from and during execution of the second application; and
does not determine the value of the field.

6. A method as described in claim 1, further comprising communicating a result of the validating to the first application.

7. A method as described in claim 1, wherein the configuration setting further comprises a field type.

8. One or more computer-readable media comprising computer-executable instructions that, when executed, perform the method as recited in claim 1.

9. A method comprising:
reading a first configuration setting of a first application including a first field and a first description of a first condition for the first field;
examining a second application to find a second configuration setting that corresponds to the first configuration setting, wherein the second application is composed of computer instructions, the computer instructions having an attribute, the attribute providing a second description of a second condition for a second field, the second configuration setting having the second field and the second description; and
comparing the second description of the second condition with the first description of the first condition to determine whether the second condition is met by the first condition, and if met then determining that the second configuration setting is valid for use with the first application.

10. A method as described in claim 9, wherein the first and second conditions are value constraints selected from the group consisting of:
an integer range;
a float range;
a value set;
a string pattern;
cardinality of a collection;
a mandatory value; and
an optional value.

11. A method as described in claim 9, wherein the first and second conditions are default values.

12. A method as described in claim 9, wherein the first and second conditions are textual descriptions selected from the group consisting of:
a description of units in which the respective first and second fields are expressed;
a description of meanings of the respective first and second fields; and
an example of values of the first and second fields.

13. One or more computer-readable media comprising computer-executable instructions that, when executed, perform the method as recited in claim 9.

14. A method comprising:
executing a documenter to find a plurality of fields in an application, wherein:
the application is composed of computer instructions;
the computer instructions having attributes; and
each said attribute providing a description of a condition for a respective said field,
forming a configuration file having a plurality of configuration settings of the application, wherein each said configuration setting includes one said field and the description of the condition for the one said field;
outputting the configuration file; and
utilizing the configuration file to validate configuration settings.

15. A method as described in claim 14, wherein the condition is a value constraint selected from the group consisting of:
an integer range;
a float range;
a value set;
a string pattern;
cardinality of a collection;
a mandatory value; and
an optional value.

16. A method as described in claim 14, wherein the condition is a default value.

17. A method as described in claim 14, wherein the condition is a textual description selected from the group consisting of:
a description of a unit in which the respective said field is expressed;
a description of meanings of the respective said field; and
an example of a value of the respective said field.

18. One or more computer-readable media comprising computer-executable instructions that perform the method as recited in claim 14.

19. A method comprising:
generating a configuration file having a plurality of configuration settings derived from a first application, wherein:
the application is composed of computer instructions;
the computer instructions having attributes;
each said attribute providing a description of a condition for a field; and
each said configuration setting having one said field and a corresponding said description; and
validating whether the first application is valid for use with a second said application by comparing each said configuration setting of the first application with a corresponding said configuration setting of the second said application to determine whether each said condition of the first application is met by a corresponding said condition of the second application.

20. A method as described in claim 19, wherein each condition is a value constraint selected from the group consisting of:
an integer range;
a float range;
a value set;
a string pattern;
cardinality of a collection;
a mandatory value; and
an optional value.

21. A method as described in claim 19, wherein each condition is a default value.

22. A method as described in claim 19, wherein each condition is a textual description selected from the group consisting of:
a unit in which a corresponding said field is expressed;
description of a meanings of a corresponding said field; and
an example of a value a corresponding said field.

23. One or more computer-readable media comprising computer-executable instructions that, when executed, perform the method as recited in claim 19.

24. A computer-readable medium comprising computer-executable instructions that, when executed by a computer, direct the computer to:
read a first configuration setting of a first application that includes a first field and a first description of a first condition for the first field; and validate whether the first condition is met by a second application, wherein:
the second application is composed of computer instructions;
the computer instructions have an attribute that provides a second description of a second condition for a second field; and
the first condition is validated through comparison with the second condition.

25. A computer-readable medium as described in claim 24, wherein the first and second conditions are value constraints selected from the group consisting of:
an integer range;
a float range;
a value set;
a string pattern;
cardinality of a collection;
a mandatory value; and
an optional value.

26. A computer-readable medium as described in claim 24, wherein the first and second conditions are default values.

27. A computer-readable medium as described in claim 24, wherein the first and second conditions are textual descriptions selected from the group consisting of:
a description of units in which the first and second fields are expressed;
a description of meanings of the first and second fields; and
an example of values of the first and second fields.

28. A computer comprising:
a processor; and
memory configured to maintain:
a first application composed of computer instructions, the computer instructions having an attribute, the attribute providing a first description of a first condition for a first field;
a configuration file including a configuration setting of a second application having a second field and a second description of a second condition for the second field; and
a configuration module that, when executed on the processor, validates the configuration setting for use with the first application by comparing the second description of the second condition with the first description of the first condition to determine whether the second condition is met by the first condition, and if met, then determining that the configuration setting is valid for use with the first application.

29. A computer as described in claim 28, wherein the second application is stored in the memory.

30. A computer as described in claim 28, wherein the configuration file is received in a transmission from a network for storage in the memory.

31. A computer as described in claim 28, wherein the first and second conditions are selected from the group consisting of:
a value constraint;
a default value;
a description of units in which the first and second fields are expressed;
a description of meanings of the first and second fields; and
an example of values of the first and second fields.

32. A computer comprising:
a processor; and
memory configured to maintain:
a first application composed of computer instructions, the computer instructions having an attribute, the attribute providing a first description of a first condition for a first field, and wherein a first configuration setting includes the first description and the first field;
a configuration file including a second configuration setting of a second application having a second field and a second description of a second condition for the second field; and
a configuration module that, when executed on the processor, validates the first configuration setting for use with the second application by comparing the first description of the first condition with the second description of the second condition to determine whether the first condition is met by the second condition, and if met, then determining that the first configuration setting is valid for use with the second application.

33. A computer as described in claim 32, wherein the second application is stored in the memory.

34. A computer as described in claim 32, wherein the configuration file is received over a network and stored in the memory.

35. A computer as described in claim 32, wherein the first and second conditions are selected from the group consisting of:
a value constraint;
a default value;
a description of units in which the first and second fields are expressed;
a description of meanings of the first and second fields; and
an example of values of the first and second fields.

36. A content server comprising:
a first application composed of computer instructions, the computer instructions having attributes, and each said attribute providing a description of a condition for a field;
a configuration module that is executable to validate whether each said condition is met by a second application; and
a documenter that is executable to generate a configuration file having a configuration setting of the first application, wherein the configuration setting includes the field and the description of the condition.

37. A content server as described in claim 36, further comprising a broadcast transmitter, wherein the first application, when executed, provides content for broadcast by the broadcast transmitter.

38. A content server as described in claim 36, wherein each said condition is a value constraint selected from the group consisting of:
an integer range;
a float range;
a value set;
a string pattern;
cardinality of a collection;
a mandatory value; and
an optional value.

39. A content server as described in claim 36, wherein each said condition is a default value.

40. A content server as described in claim 36, wherein each said condition is a textual description selected from the group consisting of:
a description of a unit in which a respective said field is expressed;
a description of a meaning of a respective said field; and
an example of a values of a respective said field.

41. A system comprising:

a network;

a first computer communicatively coupled to the network and including a first application composed of computer instructions, the computer instructions having a first attribute that provides a first description of a first condition for the first field, wherein a first configuration setting includes the first field and the first description;

a second computer communicatively coupled to the network and including:
- a second application composed of computer instructions having a second attribute that provides a second description of a second condition for a second field; and
- a configuration module that is executable by the second computer to validate the first configuration setting for use with the second application by comparing the first description of the first condition with the second description of the second condition.

42. A system as described in claim 41, wherein the first computer is configured as a set-top box and the second computer is configured as a content server.

43. A system as described in claim 41, wherein the first and second conditions are selected from the group consisting of:

a value constraint;

a default value;

a description of units in which the first and second fields are expressed;

a description of meanings of the first and second fields; and an example of values of the first and second fields.

* * * * *